(12) United States Patent
Wolmuth

(10) Patent No.: US 7,702,084 B2
(45) Date of Patent: *Apr. 20, 2010

(54) TOLL-FREE DIRECTORY ASSISTANCE WITH PREFERRED ADVERTISEMENT LISTING

(75) Inventor: Scott Wolmuth, Santa Rosa, CA (US)

(73) Assignee: Jingle Networks, Inc., Bedford, MA (US)

( * ) Notice: Subject to any disclaimer, the term of this patent is extended or adjusted under 35 U.S.C. 154(b) by 97 days.

This patent is subject to a terminal disclaimer.

(21) Appl. No.: 11/897,264

(22) Filed: Aug. 29, 2007

(65) Prior Publication Data

US 2008/0091536 A1  Apr. 17, 2008

Related U.S. Application Data

(63) Continuation of application No. 11/728,189, filed on Mar. 23, 2007, which is a continuation of application No. 10/063,990, filed on May 31, 2002, now Pat. No. 7,212,615.

(51) Int. Cl.
*H04M 1/64* (2006.01)

(52) U.S. Cl. ............ 379/88.22; 379/93.12; 379/114.05; 379/114.1; 379/114.11; 379/114.12; 379/114.13

(58) Field of Classification Search .............. 379/88.22, 379/93.12, 114.05, 114.1, 114.11, 114.12, 379/114.13
See application file for complete search history.

(56) References Cited

U.S. PATENT DOCUMENTS

| | | | |
|---|---|---|---|
| 4,850,007 A | 7/1989 | Marino et al. | |
| 4,943,995 A | 7/1990 | Daudelin et al. | |
| 5,361,295 A | 11/1994 | Solomon et al. | |
| 5,557,658 A * | 9/1996 | Gregorek et al. | ......... 379/88.25 |
| 5,909,670 A | 6/1999 | Trader et al. | |
| 6,614,896 B1 | 9/2003 | Rao | |
| 6,970,548 B2 | 11/2005 | Pines et al. | |
| 7,113,571 B2 | 9/2006 | Matsubara et al. | |
| 7,400,711 B1 * | 7/2008 | Ford et al. | .................. 379/70 |
| 2003/0032409 A1 | 2/2003 | Hutcheson et al. | |

OTHER PUBLICATIONS

Declaration of Scott Wolmuth with attached Exhibit A entitled "Project Description Business Plan for Start Up Funding," posted to Elance.com (May 30, 2001).

* cited by examiner

*Primary Examiner*—Quynh H Nguyen
(74) *Attorney, Agent, or Firm*—Hamilton, Brook, Smith & Reynolds, P.C.

(57) ABSTRACT

The current invention is a system for providing telephone directory assistance service in which a telephone user calls to the system and the system will, based on the requested number or type of service, hear a recorded advertisement. An advertiser may target its own telephone number so that consumer requests for information that return the advertiser's telephone number are controlled, thereby preventing competitors of the advertisers from directing advertisements to those consumers. The advertisements are selected from a databank, which may include any number advertisements categorized within the category associated with the service, according to selection criteria. After the advertising announcement is completed, the directory assistance call is processed as usual. The selection criteria can include the use of SIC codes.

17 Claims, 6 Drawing Sheets

SIC Division Structure

A. Division A: Agriculture, Forestry, and Fishing
   - Major Group 01: Agriculture Production Crops
   - Major Group 02: Agricultural Production Livestock And Animal Specialities
   - Major Group 07: Agricultural Services
   - Major Group 08: Forestry
   - Major Group 09: Fishing, Hunting, and Trapping B. Division B: Mining
   - Major Group 10: Metal Mining
   - Major Group 12: Coal Mining
   - Major Group 13: Oil And Gas Extraction
   - Major Group 14: Mining And Quarrying Of Nonmetallic Minerals, Except Fuels C. Division C: Construction
   - Major Group 15: Building Construction General Contractors And Operative Builders

FIG. 3

SIC Major Group 58

Major Group 58:   Eating And Drinking Places

Major Group Structure

This major group includes retail establishments selling prepared foods and drinks for consumption on the premises; and also lunch counters and refreshment stands selling prepared foods and drinks for immediate consumption. Restaurants, lunch counters, and drinking places operated as a subordinate service facility by other establishments are not included in this industry, unless they are operated as leased departments by outside operators. Thus, restaurants and lunch counters operated by hotels are classified in Services, Major Group 70; those operated by department stores in Major Group 53. Bars and restaurants owned and operated for members of civic, social, and fraternal associations only are classified in Industry 8641. Mobile food and dairy wagons are classified in Industry 5963.

- Industry Group 581: Eating And Drinking Places
    ○ 5812 Eating Places
    ○ 5813 Drinking Places (Alcoholic Beverages)

FIG. 4

TOLL-FREE DIRECTORY ASSISTANCE WITH PREFERRED ADVERTISEMENT LISTING

RELATED APPLICATION(S)

This application is a continuation of U.S. application Ser. No. 11/728,189, filed Mar. 23, 2007 which is a continuation of U.S. application Ser. No. 10/063,990, filed May 31, 2002, now issued as U.S. Pat. No. 7,212,615. The entire teachings of the above application(s) are incorporated herein by reference.

BACKGROUND OF THE INVENTION

1. Field of the Invention

This invention relates to systems for providing telephone toll services such as, but not limited to, directory assistance or long-distance calling.

2. Description of Prior Art

The need for phone customers to locate the name, address and number of businesses such as airlines, floral shops and auto repair shops has been around for almost as long as the phone has been in existence.

Currently most phone systems charge extra for the look up of the names and addresses and numbers of general or specific businesses. This can get to be costly and many telephone customers find such directory assistance charges to be excessive.

There is also a current need for many businesses to market to a wide pool of consumers with targeted advertisement. This can be done efficiently through the use of SIC codes or "Standard Industry Codes." By knowing exactly what a particular consumer is looking for at that particular moment a company can target their scope of interest with an ad.

The use of advertisements within a telephone system is well known in the art. U.S. Pat. No. 4,850,007 by Marino is for a "Telephone toll service with advertising". It is a system for providing an economical telephone toll service in which a telephone subscriber selects the economical service by, for example, sending an appropriate signal, and then dials his directory assistance call or other telephone toll call. After the caller's options are determined, and typically before signaling for the call is commenced, a recorded-announcement of an aural or visual nature is connected to the subscriber's line, with the announcement consisting of at least one advertisement. The advertisements are selected from a databank according to some predetermined technique of selection, which may include any number of factors or features to make the service attractive to subscribers and of a nature to make the service also sufficiently rewarding to advertisers. The advertisement is not however, tied to the caller's specific interests or SIC code based on the number dialed.

U.S. Pat. No. 5,448,625 by Lederman is a "Telephone advertising method and apparatus." It is a method and apparatus for routing a telephone call through a telephone network from a caller to a called party designated by the caller via advertising service apparatus that operates in two modes successively, the parties being in communication with each other in one mode and ads are selected from storage during that mode and the ads are impressed on one or both of the parties during a different mode. Selection of ad messages for use is controlled by many criteria. Delivery of the advertisements is recorded for accounting purposes. The modes may alternate between message intervals whose duration is determined by ad message length and communication intervals whose length is determined by a talking time timer. Still there is a need for better selection criteria.

U.S. Pat. No. 5,852,775 by Hidary is a "Cellular telephone advertising system." It discloses a cellular telephone system, which is provided with an ad server and a memory for holding various commercial messages. The messages are either generic or are tailored for specific demographically selected subscribers or geographic cells. When communication is established either between a subscriber or a nonsubscriber, at least one of them receives either a generic or a specific commercial message. These advertisements are not geared to the needs of a particular caller.

U.S. Pat. No. 5,652,784 by Blen is an "Automatic telephone advertising provided in lieu of dial-tone." This invention discloses a telephone advertising service providing a short advertising message through a telephone receiver as a telephone call is initiated. Several different messages are offered in different sets of channels, with the messages changing depending on the time of day. When a prohibit service signal is active, the subscriber line is switched directly to the telephone exchange. These messages are not targeted towards the interests of a particular caller.

There is still room for improvement within the art.

SUMMARY OF THE INVENTION

It is a general object of the present invention to have a process that allows the cross marketing of phone customers when they ask for directory assistance.

The current invention is such that if a consumer is interested in airline tickets and they are calling Directory Assistance an ad based on their interest is played to that consumer. An airline or travel related ad will have a much higher impact and be received with a much higher level of interest with this consumer than to someone who is watching the evening news and is shown an airline ad.

By knowing exactly what a particular consumer is looking for at the moment they are looking; you can target their scope of interest with an ad. Using SIC code or "Standard Industry Code" or even some other variable such as having a live operator select which ad would be appropriate does this.

The concept is to use the information obtained in the 10 second listing request to play a targeted message and offer instant access to the product or service related to that message via "live call transfer" or "press 1 to be transferred to (the advertiser) now".

For non-SIC code ads general, non-category specific ads such as "refinancing your home" or a home improvement ad can be played. These ads can be played based on the point of call. This can be done by setting up calls to be routed to a specific ad if the point of the caller's location is within a specific area code, zip code, city block or other parameter.

This would be helpful for companies like Home Depot, who might want to buy ad space in zip codes of "mostly owner occupied residences", or pay day advance stores, who might want to buy advertisement for areas which are more economically depressed.

The type of ad and when the ad is played, can be controlled to a highly specific degree.

This system involves Point of call routing which is the routing an inbound 800 number call based on the location of the caller and routing the call to any predetermined location using zip code, area code, area code and prefix or city block maps.

Ads can be bought to target specific competitor names or industry codes. They can also be bought by markets delineated by zip code, area code city block or statewide.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3 gives an example of Division Structure of SIC codes;

FIG. 4 gives an example of a Major Group of the SIC codes;

DETAILED DESCRIPTION OF THE INVENTION

A description of example embodiments of the invention follows.

Preferred Embodiment

The preferred embodiment of the invention is a process that allows the cross marketing of phone customers asking for directory assistance.

Figure 1:
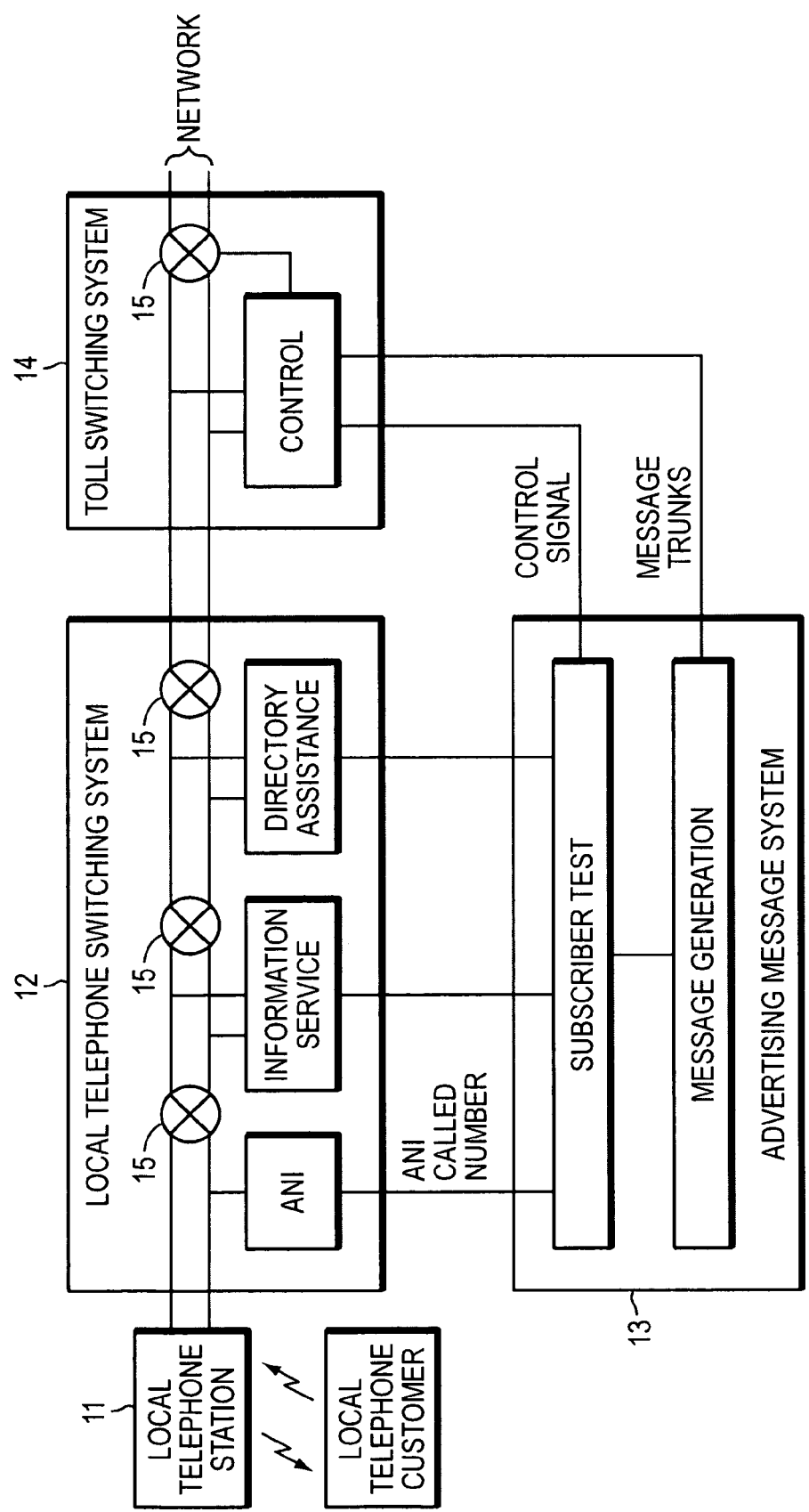
FIG. 1 is a block diagram of a telephone toll system embodying the present invention.

In FIG. 1, the local telephone station 11 is the typical telephone handset, in the usual case, and is connected by the typical local loop wires and connections to a local telephone switching system 12 which in turn connects through a toll switching system 14 to the total telephone network. Interconnected with the local telephone switching system 12 and the toll switching system 14 is the advertising message system 13 which is adapted to provide the directory assistance which has been generally summarized above.

In general, the local telephone station 11 is used by a local telephone customer, the User 10, indicated schematically.

The internal connections of the system are, in more detail, the following. The line from local telephone station 11 will be routed, through portions of switching elements 15, to the directory assistant module of the local switching system 12 if that is the nature of the customer's request, and in general, this may have been reached by dialing a specific phone number such as 1-800-Dealers.

It is anticipated that the broadest volume of use will result from long distance calling. The preferred embodiment will use a routing automatic number identification (ANI) within local telephone switching system 12, together with the subscriber test equipment in advertising message system 13, will identify the local customer in question as being one who wants to receive reduced directory assistance or long distance calling so that his incoming line will automatically be connected to advertising message system 13 before his toll call is completed.

In all of the foregoing situations identified in local telephone switching system 12, the result will be that a signal is sent to advertising message system 13 which results in a control signal being sent to toll switching system 12 to switching elements 16 to prevent the further progress of the user's call until the new features of this toll service have been provided. Therefore, at this point, the local telephone subscriber is not in contact with the larger telephone network.

In point of fact, this message may be of either an aural or visual nature, especially if the local subscriber has made available a monitor or television set connected to his telephone line. When this message ends, the control network within toll switching system 14 then removes the block on the signaling for the toll call and the call goes out over the network in the usual fashion.

The current invention is as follows if a consumer is interested in airline tickets RIGHT NOW and they are calling Directory Assistance the correct ad played to that consumer, an airline or travel related ad, will have a much higher impact and be received with a much higher level of interest than to someone who is watching the evening news and is shown an airline ad.

By knowing exactly what a particular consumer is looking for at the moment they are looking you can target their scope of interest with an ad. Using SIC code or "Standard Industry Code" or even some other variable such as having a live operator select which ad would be appropriate does this.

The concept is to use the information obtained in the 10 second listing request to play a targeted message and offer instant access to the product or service related to that message via "live call transfer" or "press 1 to be transferred to (the advertiser) now".

For non SIC code ads general, non-category specific ads such as "refinancing your home" or a home improvement ad can be played. These ads can be played based on the point of call. This can be done by setting up calls to be routed to a specific advertisement if the point of the callers location is within a specific area code, zip code, city block or other parameter.

This would be helpful for companies like Home Depot, who might want to buy ad space in zip codes of "mostly owner occupied residences" or pay day advance stores which may want to purchase advertisement for areas that are more economically depressed.

The type of ad and when the ad is played can be controlled to a highly specific degree.

In the preferred embodiment the system will use Point of call routing, which is the routing of an inbound 800 number call based on the location of the caller and connecting that caller to any predetermined location using zip code, area code, area code and prefix or city block maps.

Ads can be bought to target specific competitor names or industry codes. They can also be bought by markets delineated by zip code, area code city block or statewide.

The advertisements could also have been chosen on a random basis, or they could have been chosen to provide sufficient exposure to each of the advertisers who provided the ads for this service. In any event these advertisements will be stored in a large-scale mass memory or memory means.

In all of the foregoing versions of the service, it should be apparent that the interactive logic could be extended to make it possible for the customer to indicate, e.g., by dialing appropriate digits, that he wishes written material to be sent to him or that he wishes to talk to a salesman—now or later.

Figure 2:
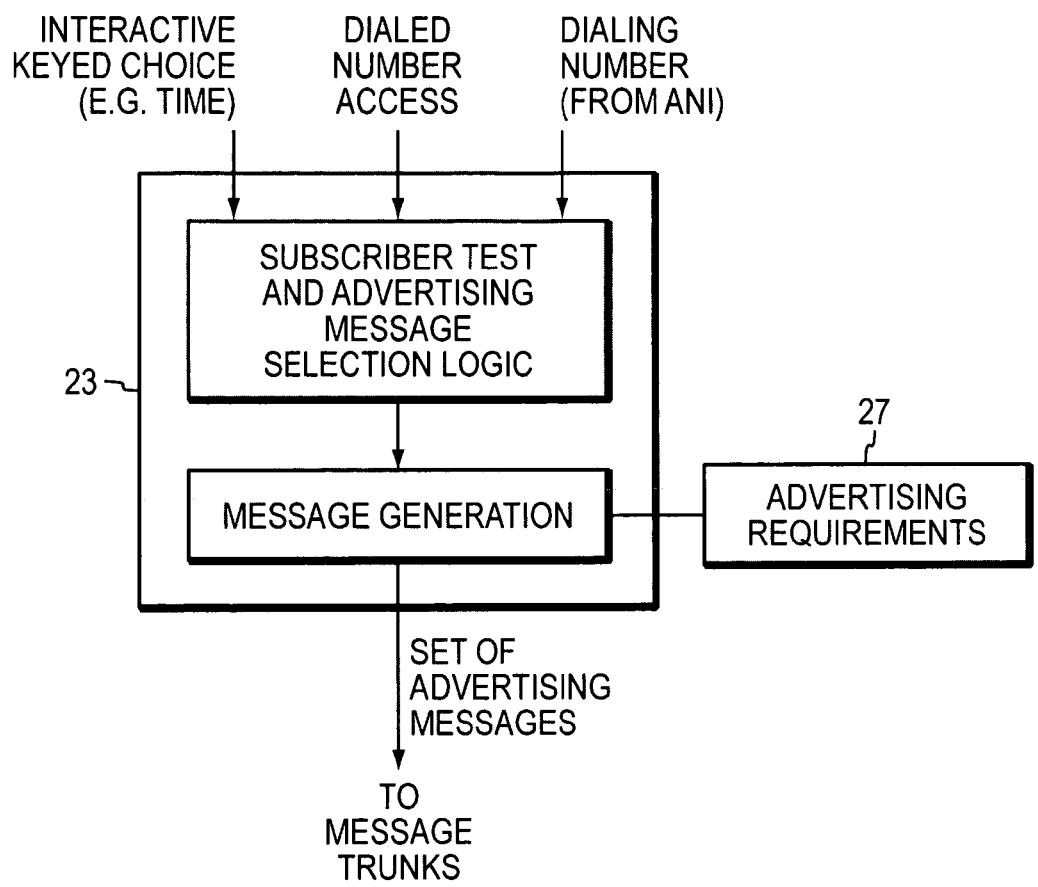
FIG. 2 shows a block diagram of parts of the system involved with selecting the type of announcement connected to a particular subscriber's line.

We have attempted to lay out in FIG. 2 a chart illustrating most of the foregoing message choice criteria in a logical manner.

We have disclosed a sample of the SIC Division Structure in FIG. 3 and the SIC Major Group 58 in FIG. 4 to display the industry standard codes that can be used in the selection process.

Figure 5:
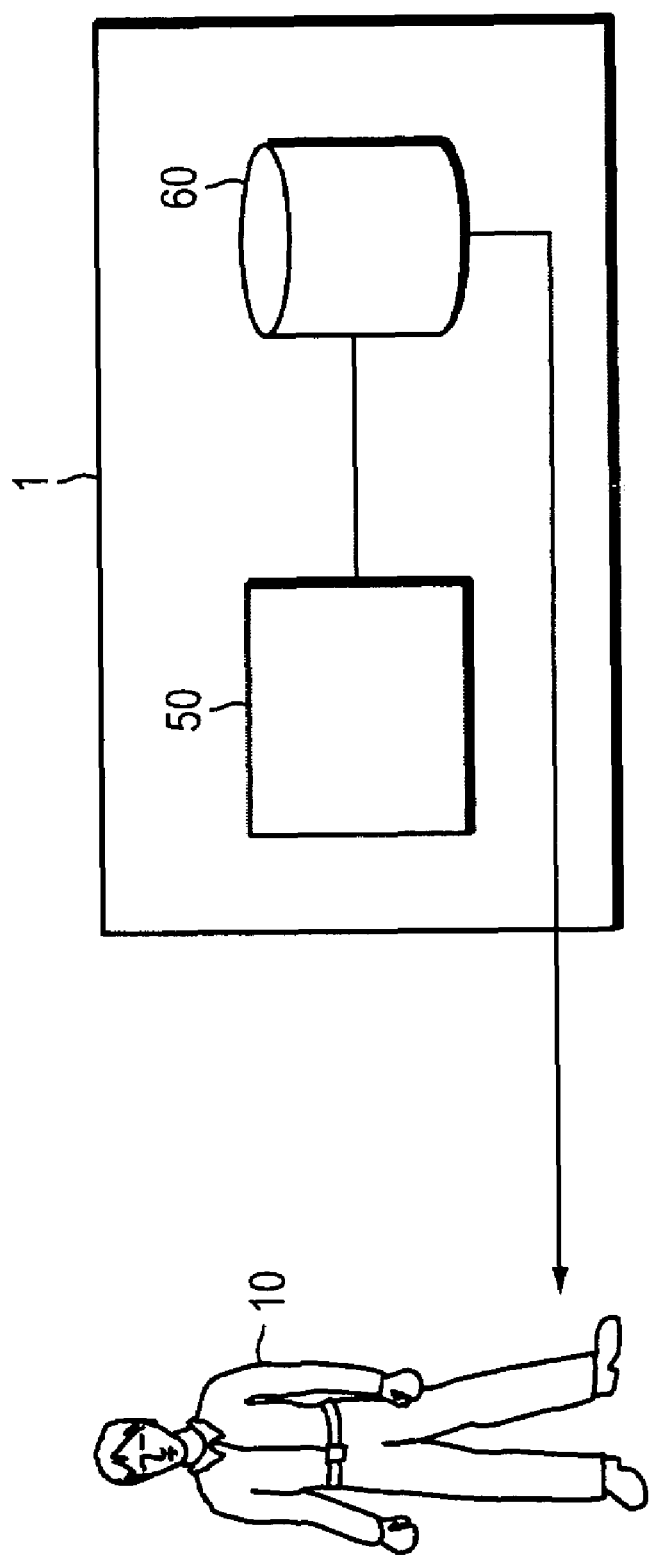
FIG. 5 is a schematic of the system.

FIG. 5 is a schematic of how system 1 works. The User 10 calls and is connected to a directory assistance number. The User 10 requests a number or a type of service or good, the system uses this as part of the selection criteria which is used by a selection means 50 such as a computer processor and selects an advertisement from the database 60 and the advertisement is played back to the User 10.

Figure 6:
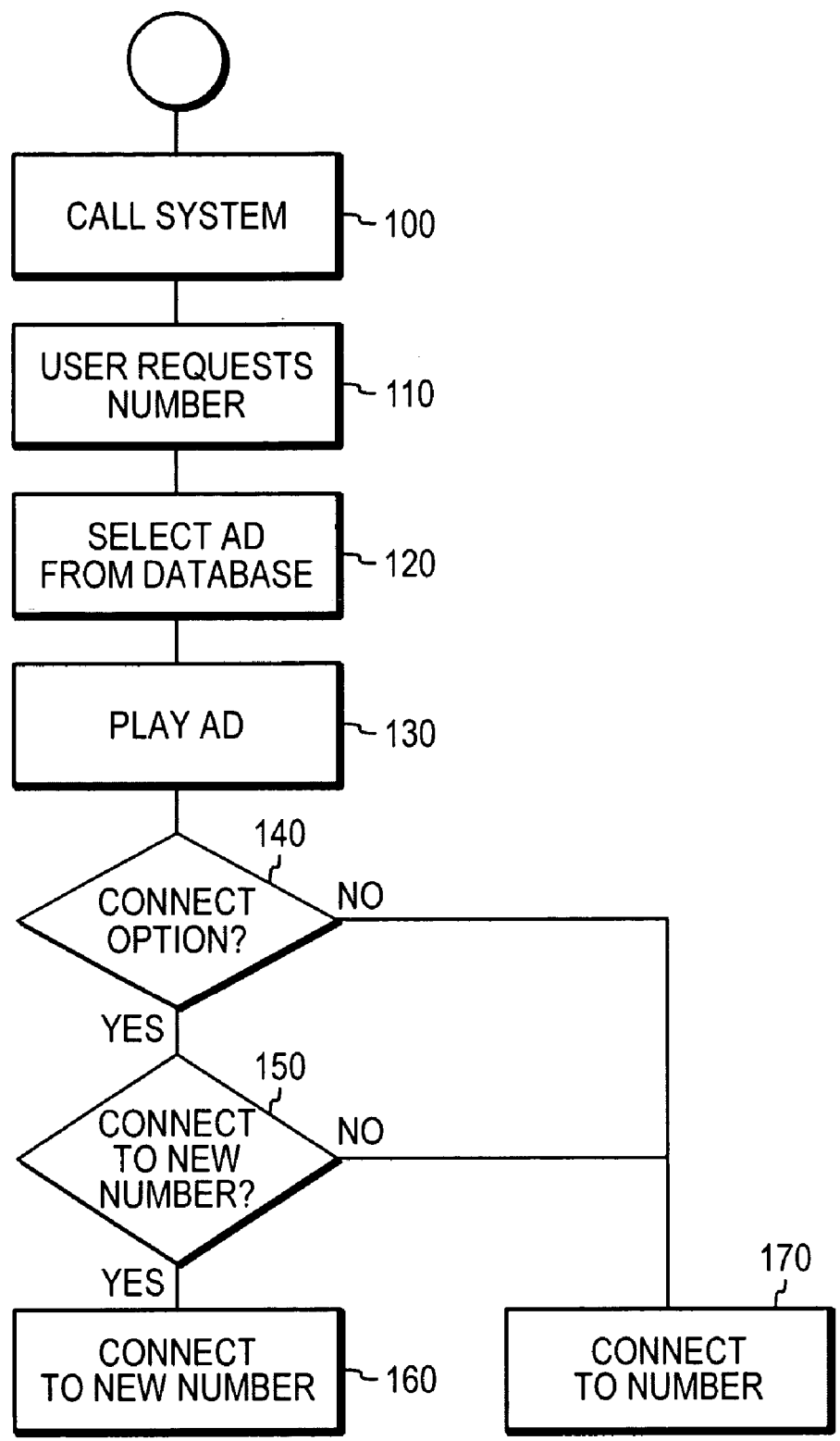
FIG. 6 gives a flowchart of the system.

FIG. 6 is a basic flowchart of the process. In Step 100, the User 10 calls the system 1. The User 10 then requests a specific number of a company or a type of goods or services in Step 110. The system 1 uses the request, along with additional information such as the locations from where call was placed and other targeting information to select an ad from the advertising database 60 in step 120. The system 1 retrieves the ad and plays it for the User 10 in step 130. In step 140, the system 1 asks "is there a connection option for this ad?" If yes, the User 10 is asked if they want to opt to be connected to the advertiser's number 150. If yes, the User 10 is connected to the advertiser's number 160. If no, the User 10 is connected to their selected number 170. If there is no connection option for this ad, the User 10 is connected to their selected number 170.

Moreover, advertisements may be purchased by advertisers to include targeting their own telephone number. These so-called "preferred listings" allow the purchasing advertiser to target consumer requests for information that return the "preferred listing" advertiser's telephone number, thereby preventing competitors of the "preferred listing" advertiser from directing advertisements to those consumers. "Preferred listing" advertisers may select an advertisement to be played to consumers whose request for information returns the telephone number of the "preferred listing" advertiser, or may complete the call connection without playing an advertisement played at all.

Additional Embodiment

This system could also be used in a wireless environment with Handheld PCs or an Internet or chat environment.

Advantages

The current invention provides much needed inexpensive directory assistance. The user calls a unique number for directory assistance, an operator answers that call and asks the user of his/her desired phone number, the system then uses this phone number as one of the basis for the selection criteria to select an advertisement for the system to play for the user. After the user listens to the advertisement, the system will provide the user with the desired phone number. The system may have the option for the user to select on or contact another company for the service.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

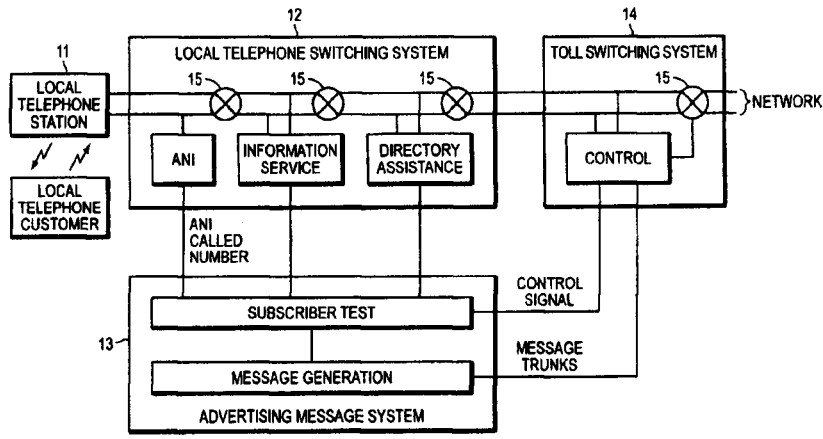

What is claimed is:

1. A method for providing directory assistance information in a public telecommunication network via a toll-free number, the method comprising:

receiving a request for information relating to a telephone number for a specific provider of goods or services from a customer station at a call processing station;

querying a database responsive to the request for information received from the customer station to determine: i) whether the specific provider of goods or services is an advertiser associated with the database and ii) whether the specific provider of goods or services has selected an advertisement to be played to a customer at the customer station in response to receiving the request for information;

selecting a response associated with the specific provider of goods or services, the response being selected based on whether the specific provider of goods or services has selected that an advertisement be played, the selected response prevents competitors of the specific provider of goods or services from directing advertisements to the customer station;

the selecting further comprising querying a database of advertisements to determine a selected advertisement associated with the specific provider of goods or services, the database includes the selected advertisement and a number of other advertisements categorized within a category associated with the specific provider of goods or services;

receiving the selected advertisement from a stored media; and forwarding the selected advertisement to the customer station.

2. The method of claim 1, further comprising:

causing the selected advertisement to be played to the customer station in an audible form.

3. The method of claim 1, further comprising:

causing the selected advertisement to be played to the customer station in a visual form.

4. The method of claim 1, further comprising:

providing access to a service associated with the selected advertisement.

5. The method of claim 3, further comprising:

connecting the customer station to a telephone number associated with the selected advertisement.

6. The method of claim 4 wherein the connecting is performed only after optionally prompting the user of the customer station.

7. The method of claim 1, further comprising:

connecting the customer station to a telephone number for the specific provider of goods or services associated with the request for information.

8. A system for providing access to directory assistance information for a public network via a toll-free number, the system comprising:

a call processing station that operates to:

receive a request for directory assistance information from a customer station, query a database responsive to the received request to determine:

i) whether a specific provider of goods or services is an advertiser associated with the database and ii) whether the specific provider of goods or services has selected an advertisement to be played to a customer at the customer station in response to receiving the request;

select a response associated with the specific provider of goods or services, the response being selected based on whether the specific provider of goods or services has selected that an advertisement be played, the selected response prevents competitors of the specific provider of goods or services from directing advertisements to the customer station;

query a database to determine the selected advertisement associated with the specific provider of goods or services, the database includes the selected advertisement and a number of other advertisements categorized within a category associated with the specific provider of goods or services; and selectively forward a selected advertisement to the customer station.

9. The system of claim 8, the call processing station further comprising:
   a second receiver that operates to receive the request for directory assistance information from the customer station; and
   a processor that operates to retrieve the selected advertisement from a stored media.

10. The system of claim 8, further comprising:
    an audio output device that operates to cause the selected advertisement to be played to the customer station in an audible form.

11. The system of claim 8, further comprising:
    a visual output device that operates to cause the selected advertisement to be displayed at the customer station.

12. The system of claim 8, wherein the call processing station further provides access to a service associated with the selected advertisement.

13. The system of claim 12, wherein the call processing station selectively connects the customer station to a telephone number associated with the selected advertisement.

14. The system of claim 13 wherein the call processing station connects the customer station to the service provider associated with the selected advertisement after prompting the user.

15. The system of claim 8, wherein the call processing station selectively connects the customer station to a telephone number for the specific provider of goods or services associated with the request for information.

16. The method of claim 1, wherein the selected response associated with the specific provider of goods or services is not to play an advertisement.

17. The system of claim 8, wherein the selected response associated with the specific provider of goods or services is not to play an advertisement.

* * * * *

UNITED STATES PATENT AND TRADEMARK OFFICE
CERTIFICATE OF CORRECTION

PATENT NO. : 7,702,084 B2  
APPLICATION NO. : 11/897264  
DATED : April 20, 2010  
INVENTOR(S) : Scott Wolmuth Page 1 of 1

It is certified that error appears in the above-identified patent and that said Letters Patent is hereby corrected as shown below:

Column 8, lines 8-11, Claim 15, delete Claim 15.

Signed and Sealed this
Twenty-fourth Day of April, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,702,084 B2 | |
| APPLICATION NO. | : 11/897264 | |
| DATED | : April 20, 2010 | |
| INVENTOR(S) | : Scott Wolmuth | |

It is certified that error appears in the above-identified patent and that said Letters Patent is hereby corrected as shown below:

Delete the title page and substitute therefore the attached title page showing the corrected number of claims in the patent.

Column 8, lines 8-11, Claim 15, delete Claim 15.

This certificate supersedes the Certificate of Correction issued April 24, 2012.

Signed and Sealed this
Fifteenth Day of May, 2012

David J. Kappos
*Director of the United States Patent and Trademark Office*

CERTIFICATE OF CORRECTION (continued)

(12) United States Patent
Wolmuth

(10) Patent No.: US 7,702,084 B2
(45) Date of Patent: *Apr. 20, 2010

(54) TOLL-FREE DIRECTORY ASSISTANCE WITH PREFERRED ADVERTISEMENT LISTING

(75) Inventor: Scott Wolmuth, Santa Rosa, CA (US)

(73) Assignee: Jingle Networks, Inc., Bedford, MA (US)

(*) Notice: Subject to any disclaimer, the term of this patent is extended or adjusted under 35 U.S.C. 154(b) by 97 days.

This patent is subject to a terminal disclaimer.

(21) Appl. No.: 11/897,264

(22) Filed: Aug. 29, 2007

(65) Prior Publication Data

US 2008/0091536 A1 Apr. 17, 2008

Related U.S. Application Data

(63) Continuation of application No. 11/728,189, filed on Mar. 23, 2007, which is a continuation of application No. 10/063,990, filed on May 31, 2002, now Pat. No. 7,212,615.

(51) Int. Cl.
*H04M 1/64* (2006.01)

(52) U.S. Cl. ........... 379/88.22; 379/93.12; 379/114.05; 379/114.1; 379/114.11; 379/114.12; 379/114.13

(58) Field of Classification Search ........... 379/88.22, 379/93.12, 114.05, 114.1, 114.11, 114.12, 379/114.13
See application file for complete search history.

(56) References Cited

U.S. PATENT DOCUMENTS

| | | | |
|---|---|---|---|
| 4,850,007 A | 7/1989 | Marino et al. | |
| 4,943,995 A | 7/1990 | Daudelin et al. | |
| 5,361,295 A | 11/1994 | Solomon et al. | |
| 5,557,658 A * | 9/1996 | Gregorek et al. | 379/88.25 |
| 5,909,670 A | 6/1999 | Trader et al. | |
| 6,614,896 B1 | 9/2003 | Rao | |
| 6,970,548 B2 | 11/2005 | Pines et al. | |
| 7,113,571 B2 | 9/2006 | Matsubara et al. | |
| 7,400,711 B1 * | 7/2008 | Ford et al. | 379/70 |
| 2003/0032409 A1 | 2/2003 | Hutcheson et al. | |

OTHER PUBLICATIONS

Declaration of Scott Wolmuth with attached Exhibit A entitled "Project Description Business Plan for Start Up Funding," posted to Elance.com (May 30, 2001).

* cited by examiner

*Primary Examiner*—Quynh H Nguyen
(74) *Attorney, Agent, or Firm*—Hamilton, Brook, Smith & Reynolds, P.C.

(57) ABSTRACT

The current invention is a system for providing telephone directory assistance service in which a telephone user calls to the system and the system will, based on the requested number or type of service, hear a recorded advertisement. An advertiser may target its own telephone number so that consumer requests for information that return the advertiser's telephone number are controlled, thereby preventing competitors of the advertisers from directing advertisements to those consumers. The advertisements are selected from a databank, which may include any number advertisements categorized within the category associated with the service, according to selection criteria. After the advertising announcement is completed, the directory assistance call is processed as usual. The selection criteria can include the use of SIC codes.

16 Claims, 6 Drawing Sheets